United States Patent Office 3,660,416
Patented May 2, 1972

3,660,416
PREPARATION OF ALDEHYDES FROM ESTERS
Jaroslav Vit, Belle Mead, N.J., assignor to National Patent
Development Corporation, New York, N.Y.
No Drawing. Filed Jan. 28, 1970, Ser. No. 6,565
Int. Cl. C07d 31/32
U.S. Cl. 260—297 R                                    11 Claims

ABSTRACT OF THE DISCLOSURE

Organic esters are reduced to aldehydes by using sodium aluminum hydrides of the formula $$NaAlH_x(OR_1)_{4-x}$$

at a low temperature, preferably in an ether or aromatic hydrocarbon, $R_1$ is ether lower alkoxy lower alkyl, lower dialkylamino lower alkyl, tetrahydrofurfuryl or pyranyl-methyl. The reaction is carried out below 0° C. preferably −40 to −70° C.

---

The present invention relates to the preparation of aldehydes.

Complex metal hydrides are known for the reduction of carboxylic acid esters to alcohols, Finholt et al., J. Amer. Chem. Soc., vol. 69, 1199 (1947). This reaction was later further developed and new complex hydrides were discovered. In general, all of these reductions are carried out as Finholt et al. had described for $LiAlH_4$, the organic ester in ether solution is added dropwise under reflux into an ether solution of the complex metal hydride in a molar ratio of ester to hydride of 2 or less.

The general equation for the reaction is as follows:

(I) $2R_1COOR_2 + MeAlH_4 \rightarrow$
$$MeAl(OCH_2R_1)_2(OR_2)_2$$

where Me is Li, Na or K, and $R_1$ and $R_2$ are hydrocarbyl. The alcohol formed is then released from the metal aluminum alkoxide by hydrolysis and isolated from the ether layer as follows:

(II) $MeAl(OCH_2R_1)_2(OR_2)_2 + 2H_2O \rightarrow$
$$2R_1CH_2OH + 2R_2OH + MeAlO_2$$

Subsequently under different conditions, aldehyde formation in reactions between esters and metal aluminum hydrides was observed by Zacharkin et al. Tetrahedron letters 1963(29), pages 2087–2090 according to equation (III)
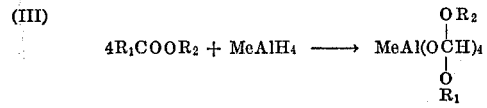

For reaction III the conditions were as follows:

(a) molar ratio ester to hydride of 4 or more,
(b) low temperature in the range of −60° to −45° C.,
(c) an inverse reaction procedure in which an ether solution of the hydride is added dropwise into a solution of the ester.

In all three of these required conditions (a, b, and c), reaction III differs sharply from reaction I.

Aldehyde is released from the complex metal alkoxide formed in reaction III in the next step by hydrolysis provided by pouring the reaction mixture into a water solution of $NaHSO_3$ according to the equation (IV)
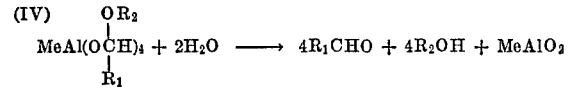

The aldehyde produced is fixed as a complex with sodium bisulfite in the water layer, then the alcohol $R_2OH$ is extracted with ether and finally the aldehyde is released from its bisulfite complex by adding acid or alkali and extracting with ether. The aldehydes obtained were isolated as 2,4-dinitrophenyl hydrazones. This method of preparing aldehydes has many disadvantages and it has never been used in a practical or commercial sense in aldehyde synthesis.

One of the reasons for this is that reaction III requires low temperatures (−60 to −45° C.) at which the solubilities of the starting complex metal hydrides are very low, near zero, and the solubilities of the metal aluminum alkoxides formed in reaction III are even worse. Solubilities of the ester reactants at low temperatures are low and with all but very low molecular weight esters, the main part of the material stays undissolved. Under these circumstances, the molar ratio of ester to hydride (a ratio of 4 is required for reaction III) is impossible to control because the reaction proceeds in solution only where the required ratio of the reactants is in the ratio of the solubilities. In addition, the slow reaction rate in strongly alkaline solution of alkoxides causes side reactions such as condensation of the starting esters and the aldehydes produced and a mixture of products is obtained as a result. For these and other reasons reaction III has not been satisfactorily developed to make aldehydes on a practical scale.

It is an object of the present invention to develop a novel process for preparing aldehydes from carboxylic acid esters.

Another object is to prepare aldehydes in good yields from carboxylic acid esters.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that carboxylic acid esters can be reduced to aldehydes in excellent yields using sodium dihydro bis(2-methoxyethoxy) aluminate and related compounds. The reaction differs from reaction III in that the aldehyde is not bonded in an alkoxide form and the complex alkoxide formed as a second product in the reaction has a high solubility. A specific example using ethyl acetate as the ester and sodium dihydro bis-(2-methoxyethoxy) aluminate as the reducing agent is shown in the following equation:

(V) $2CH_3COOC_2H_5 + NaAlH_2$
$(OCH_2CH_2OCH_3)_2 \rightarrow 2CH_3CHO +$
$$NaAl(OC_2H_5)_2(OCH_2CH_2OCH_3)_2$$

As organic esters there can be used esters having Formula (a) or Formula (b)

(a) $R_3COOR_4$
(b) $R_4OOC(CH_2)_nCOOR_4$ where $R_3$ is alkyl (including cycloalkyl), aryl (also called carbocyclic aryl), aralkyl, alkoxyaryl, alkoxyalkyl, haloaryl, cyanoaryl, cyanoalkyl, tert. aminoaryl, tert. aminoalkyl, carboxyaryl or heterocyclic, $R_4$ is alkyl,

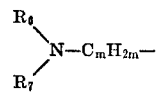

aralkyl, tetrahydrofurfuryl, lower alkyl tetrahydrofurfuryl, pyranyl methyl, $R_5(OC_mH_{2m})_i$− where $R_5$ is alkyl, tetrahydrofurfuryl, aralkyl, lower alkyl tetrahydrofurfuryl, pyranylmethyl or

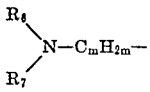

where $R_6$ and $R_7$ are alkyl or lower alkoxy lower alkyl, $m$ is an integer of at least 2 and $l$ is an integer of at least 1 and $n$ is 0 or a positive integer, e.g. of 1 to 10. Preferably when any of $R_4$, $R_5$, $R_6$ and $R_7$ is alkyl it is a lower alkyl, more preferably of 1 to 4 carbon atoms and most preferably of 1 to 2 carbon atoms. $l$ is preferably an integer of 1 to 4, more preferably 1 to 2 and most preferably 1. $m$ is preferably 2 to 4, most preferably 2, when R is alkyl preferably it is a normal alkyl.

As sodium aluminum hydride reducing agents there are employed compounds of the general Formula (c) $NaAlH_x(OR_8)_{4-x}$ where X is 1 or 2 and $R_8$ is tetrahydrofurfuryl, lower alkyl tetrahydrofurfuryl, pyranylmethyl,

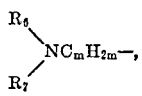

$R_5(OC_mH_{2m})_l-$, $R_5$, R , $R_7$, $l$ and $m$ are as defined above.

Examples of esters within Formulae (a) and (b) are methyl acetate, ethyl acetate, propyl acetate, hexyl acetate, cyclohexyl acetate, 2-methylcyclohexyl acetate, butyl acetate, isopropyl acetate, sec. butyl acetate, t-butyl acetate, benzyl acetate, methyl propionate, ethyl propionate, methyl butyrate, ethyl butyrate, methyl valerate, ethyl valerate, methyl octoate, ethyl octoate, methyl palmitate, methyl stearate, methyl cyclohexanoate, ethyl cyclohexanoate, methyl laurate, ethyl undecylate, methyl benzoate, ethyl benzoate, methyl p-toluate, ethyl o-toluate, methyl alpha naphthoate, ethyl beta naphthoate, methyl 2,4-dimethyl benzoate, methyl furoate (methyl ester of 2-furanecarboxylic acid), ethyl 5-methyl-2-furoate, methyl 3-pyridinecarboxylate (methyl ester of nicotinic acid), methyl 3-ethyl-4-pyridinecarboxylate, methyl ester of pyrrole-2-carboxylic acid, methyl ester of 2-tetrahydrofuranecarboxylic acid, methyl ester of quinoline-3-carboxylic acid, methyl ester of thiophene-2-carboxylic acid, methyl ester of piperidine-2-carboxylic acid, methyl-3-cyanobenzoate, methyl 3,5-dicyanobenzoate, methyl 2-cyano alpha naphthoate, methyl 2-chlorobenzoate, methyl 2,4,5-trichlorobenzoate, methyl 2-chloro-4-methyl benzoate, methyl 4-fluorobenzoate, methyl pentafluorobenzoate, methyl 3-bromobenzoate methyl 3,4 - dimethoxybenzoate, methyl 3-ethoxybenzoate, methyl methoxyacetate, methyl ethoxyacetate, methyl butoxyacetate, methyl beta methoxypropionate, methyl methoxynaphthoate, methyl 3-methoxybutyrate, methyl beta dimethylaminopropionate, methyl gamma dibutylaminobutyrate, methyl diethylaminoacetate, methyl o-diphenylaminobenzoate, ethyl p-dimethylaminobenzoate, ethyl beta cyanoacetate, methyl ester of phenylacetic acid, ethyl phenylacetate, dimethyl phthalate, diethyl terephthalate, trimethyl trimellitate, dimethyl oxalate, diethyl oxalate, diethyl malonate, dimethyl succinate, diethyl glutarate, methyl ethyl adipate, diethyl adipate, dimethyl pimelate, diethyl sebacate, dimethyl azelate, diethyl suberate, methoxyethyl acetate, ethoxyethyl acetate, butoxyethyl acetate, methoxypropyl acetate, methoxybutylacetate, methoxyethoxyethyl acetate, triethoxyethylacetate, tetrahydrofurfuryl acetate, tetrahydrofurfuryloxyethyl acetate, methoxytriethoxyethyl acetate, tetrahydrofurfuryloxyethoxyethyl acetate, tetrahydrofurfuryloxydiethoxyethyl acetate, benzyloxyethoxy acetate, 2-pyranylmethyl acetate, dimethylaminoethyl acetate, diethylaminoethyl acetate, methyl ethyl aminoethyl acetate, dibutylaminoethyl acetate, dimethylaminoethoxyethyl acetate, diethylaminodiethoxyethyl acetate, dimethylaminopropyl acetate, diethylaminobutyl acetate, ethoxydipropoxypropyl acetate, methoxyethyl stearate, methoxyethyl trimethyl acetate [$(CH_3)_3(COOCH_2CH_2OCH_3)$], methoxy decanoate ethoxy neodecanoate, bis(methoxyethoxy) adipate, bis-(dimethylaminoethyl) adipate, ditetrahydrofurfuryl succinate, dimethylaminoethyl valerate, dimethylamino ethyl valerate, dimethylaminoethyl hexanoate.

As sodium aluminum hydrides of Formula (c) there can be used sodium dihydro bis-(2-methoxyethoxy) aluminate,
sodium hydro tris-(2-methoxyethoxy) aluminate,
sodium dihydro bis(2-ethoxyethoxy) aluminate,
sodium hydro tris(2-ethoxyethoxy) aluminate,
sodium dihydro bis(2-propoxyethoxy) aluminate,
sodium dihydro bis(2-butoxyethoxy) aluminate,
sodium hydro tris(2-butoxyethoxy) alluminate,
sodium dihydro bis(3-methoxypropoxy) aluminate,
sodium hydro tris(3-methoxypropoxy) aluminate,
sodium dihydro bis(4-methoxybutoxy) aluminate,
sodium hydro tris(4-methoxybutoxy) aluminate,
sodium dihydro bis(3-ethoxypropoxy) aluminate,
sodium hydro tris(4-methoxybutoxy) aluminate,
sodium dihydro bis(2-benzyloxyethoxy) aluminate,
sodium dihydro bis(tetrahydrofurfuryloxy) aluminate,
sodium hydro tris(tetrahydrofurfuryloxy) aluminate,
sodium dihydro bis(pyranylmethoxy) aluminate,
sodium dihydro bis(2-dimethylaminoethoxy) aluminate,
sodium hydro tris(2-dimethylaminoethoxy) aluminate,
sodium dihyro bis(2-diethylaminoethoxy) aluminate,
sodium hydro tris(diethylaminoethoxy) aluminate,
sodium dihydro bis(2-methyl ethyl aminoethoxy) aluminate,
sodium dihydro bis(2-dibutylaminoethoxy) aluminate,
sodium dihydro bis(3-dimethylaminopropoxy) aluminate,
sodium hydro tris(3-diethylaminopropoxy) aluminate,
sodium dihydro bis(4-dimethylaminobutoxy) aluminate,
sodium dihydro bis(2-tetrahydrofurfuryloxyethoxy) aluminate,
sodium dihydro bis(2-tetrahydrofurfuryloxydiethoxy) aluminate,
sodium hydro tris(2pyranylmethoxydiethoxy) aluminate,
sodium dihydro bis(2-methoxytriethoxy) aluminate,
sodium hydro tris(2-methoxytriethoxy) aluminate,
sodium dihydro bis(pentaethoxy) aluminate,
sodium dihydro bis(pentaethoxy) aluminate,
sodium dihydro bis(4-ethoxy tetrabutoxy) aluminate,
sodium dihydro bis(2-dimethylaminoethoxyethoxy) aluminate,
sodium hydro tris(2-diethylaminoethoxyethoxy) aluminate,
sodium dihydro bis(3-methyl propylaminoethoxy propoxy) aluminate,
sodium hydro tris (4-ethoxybutoxy ethoxy) aluminate,
sodium dihydro bis(2-methoxydiethoxy) aluminate,
sodium hydro tris(methoxydiethoxy) aluminate,
sodium dihydro bis(diethoxy) aluminate,
sodium dihydro bis(3-butoxy diproproxy) aluminate,
sodium hydro tris (3-butoxy dipropoxy) aluminate,
sodium hydro tris(3-ethoxydipropoxy) aluminate,
sodium dihydro bis(3-butoxydipropoxy) aluminate,
sodium dihydro (bis[(bismethoxymethyl) methoxydiethoxy] aluminate,
sodium dihydro bis(dimethylaminopropoxy) aluminate,
sodium dihydro bis[di(methoxyethyl) aminoethoxy] aluminate,
sodium hydro bis[di(methoxyethyl) aminoethoxy] aluminate,
sodium dihydro bis(5-methyl tetrahydrofurfuryloxy) aluminate,
sodium dihydro tetrahydrofurfuryloxy 5-methyl tetrahydrofurfuryloxy aluminate.

Examples of aldehydes which can be made according to the invention are acetaldehyde, propionaldehyde, butyraldehyde, isobutyraldehyde, valeraldehyde, hexanel, cyclohexanal, octanal, decanal, stearaldehyde, isovaleraldehyde, palmitaldehyde, pivaldehyde, lauryl aldehyde, undecyl aldehyde, phenyl acetaldehyde, benzaldehyde, alpha naphthaldehyde, beta naphthaldehyde, o-tolualdehyde, m-tolualdehyde, p-tolualdehyde, glyoxal, malonaldehyde, succinaldehyde, adipaldehyde, glutaraldehyde, sebacaldehyde, suberaldehyde, eicosanal, isophthalaldehyde, terephthalaldehyde, furfuraldehyde, 5-methyl furfuraldehyde, nicotinaldehyde, 3-ethyl-4-pyridine-aldehyde, 2-aldehydopyrrol, tetrahydrofufuraldehyde, 3-aldehydroquinoline, 2-aldehydothiouhene, 2-aldehydopiperidine, 3-cyanobenzaldehyde, 3,5-dicyanobenzaldehyde, 2,3,4-tricyano benzaldehyde, 2-cyano-1-naphthaldehyde, 2-chlorobenzaldehyde, 3-chlorobenzaldehyde, 4-chlorobenzaldehyde, 2,4,5-trichlorobenzaldehyde, 2,4 - dichlorobenzaldehyde, 2-chloro-4-methyl benzaldehyde, methyl 4-fluorobenzaldehyde, pentafluorobenzaldehyde, 3-bromobenzaldehyde, 3,4-dimethoxybenzaldehyde, 3 - ethoxybenzaldehyde, 4 - methoxybenzaldehyde, methoxyacetaldehyde, ethoxyacetaldehyde, butoxyacetaldehyde, beta methoxy propionaldehyde, 2-methoxy alpha naphthoate, 3-methoxybutyraldehyde, beta dimethylaminopropionaldehyde, gamma dibutylaminobutyraldehyde, diethylaminoacetaldehyde, o-diphenylaminobenzaldehyde, p-dimethylaminobenzaldehyde, beta cyanoacetaldehyde, tetrachlorophthaldehyde, phthalaldehyde, trimellitaldehyde (benzene 1,2,4-trial), 1-indene carboxaldehyde, 2-indene carboxaldehyde.

The reaction between the ester and the sodium hydro or dihydro aluminate compound must be carried out at a low temperature, preferably −70° to −40° C. although temperatures as high as 0° C. can be employed with reduced yields or temperatures as low as −90° C. The molar ratio of reactants in the final reaction mixture is preferably such as to provide one or more moles of carboxylic ester groups per mole of available hydrogen in the hydride. Preferably there is used a slight excess of the carboxylic acid ester, e.g. 0.1 to 1 mole of carboxylic ester group excess over the available hydrogen in the hydride. Less than the required amount of ester can be used but the yield will be lower.

The reactants can be added in the normal manner, i.e. an ester is added to the hydride in solution, but preferably the reverse order of addition is used, i.e. the hydride in solution is added to the ester in solution.

As solvents there can be used all ethers and aromatic hydrocarbons having a sufficiently low melting point, e.g. dimethyl ether, diethyl ether, di-n-propyl ether, methyl n-butyl ether, di-n-amyl ether, di-n-hexyl ether, diisopropyl ether, tetrahydrofurane, toluene, m-xylene o-xylene, propylbenzene, ethylbenzene, mesitylene, p-cymene, 1,2,3-trimethyl benzene, 1,3-diethylbenzene, 1,2,3,4-tetrahydronaphthalene (Tetralin), 1-methylnaphthalene. The solvent or mixture of solvents employed should remain liquid at the reaction temperature.

The reducing agents employed and the sodium aluminum alkoxides or the like produces are quite soluble in the solvents even at −70° C. The solubilities of the sodium aluminum alkoxides produced are surprisingly high, much higher than the solubilities of many of the starting esters at this temperature. At −70° C. sparingly soluble esters usually dissolve fully in the reaction mixture after the addition of the $NaAlH_2(OCH_2CH_2OCH_3)_2$ for example. Methyl benzoate is an example of a sparingly soluble ester whose solubility is improved.

Solubility of the carboxylic ester reactant can be further increased by using esters of the type $R_3COOCH_2CH_2OCH_3$, $R_3COOCH_2CH_2OC_2H_5$

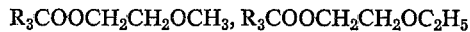

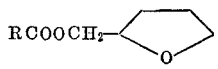

$RCOOCH_2CH_2N(CH_3)_2$, $RCOOCH_2CH_2N(C_2H_5)_2$ and other similarly substituted alkyl derivatives of the type set forth supra.

The aldehydes produced can be isolated in simple fashion but precautions of course should be taken due to the high reactivity of the aldehydes. Two types of undesirable reaction should be prevented during isolation of the aldehydes.

(a) Condensation of aldehydes in alkaline solutions.
(b) Acetal formation in acidic solutions.

Both of these reactions take place at much higher temperatures than reaction V. Thus they take place at room temperature or higher and do not interfere with the synthesis itself. However, they proceed easily during isolation of the aldehydes if no precautions are taken. The best procedure for isolation is as follows:

The complex sodium aluminum alkoxide formed in reaction V is of highly alkaline character and causes the undesirable condensation of aldehydes at room temperature. For this reason the complex sodium alkoxy aluminate should be decomposed at relatively low temperatures, preferably −5° to 0° C. or lower. The best method is to hydrolyze the alkoxide with excess of dilute acid, sulfuric is preferred.

(VI) $NaAl(OC_2H_5)_2(OCH_2CH_2OCH_3)_2 + H_2SO_4 \rightarrow$
$NaAl(So_4)_2 + 2C_2H_5OH + 2CH_3OCH_2CH_2OH$ Two clear layers are obtained, the organic layer is separated, the water layer extracted with an appropriate amount of additional solvent, the collected organic layers dried with a neutral drying agent such as calcium chloride, lithium chloride or molecular sieves able to remove not only water but also the alcohols involved ($R_4OH$, methoxyethanol, etc.), neutralized and the distilled. The aldehyde produced in most cases is easy to isolate from the solvent and excess unreacted starting ester by using a distillation column. Removal of both alcohols ($R_4OH$ and methoxyethanol) is quite important because acetals and azeotropic mixtures with water are formed easily during distillation. Using as the starting ester $R_3COOR_4$ esters where $R_4$ is alkoxyalkyl or aminoalkyl is desirable since the difference between the boiling points of the aldehyde and the ester is longer than is the case where $R_4$ is lower alkyl and hence isolation of the aldehyde is accomplished more readily.

Another permissible way of hydrolysis is to use an amount of acid sufficient to form only the sodium salt according to the following equation:

(VII) $NaAl(OC_2H_5)_2(OCH_2CH_2OH_2 + 3H_2O$
$+ \frac{1}{2}H_2SO_4 \rightarrow \frac{1}{2}Na_2SO_4 + Al(OH)_3 + 2C_5H_2OH$
$+ 2CH_3OCH_2CH_2OH$ In this manner a neutral suspension is obtained. The aldehyde can be isolated from the filtrate in the manner described above.

Isolation of high boiling or crystalline aldehydes is also accomplished in easy manner. The solvent is stripped off and the aldehyde is separated from its mixture with excess starting ester as a sodium bisulfite complex or oxime. From both derivatives it is easy to release the aldehyde by hydrolysis.

Hydrolysis of the reaction mixture with a water solution of the $NaHSO_3$ as proposed by Zacharkin is usually not successful because of the instability of the aldehyde bisulfite complex

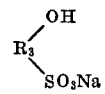

expected in the resulting alkaline solution. The bisulfite complex expected is hydrolyzed in alkaline solution after hydrolysis of the reaction mixture. The reactions are shown in Equations VIII and IX.

(VIII)

$$NaAlO_2 + 2H_2O \longrightarrow NaOH + Al(OH)_3$$

(IX)

$$R_3\overset{OH}{\underset{|}{CH}}SO_3Na + NaOH \longrightarrow R_3CHO + Na_2SO_3 + H_2O$$

The most preferable combination of the ester and reducing agent for the aldehyde synthesis is $$R_3COOC_mH_{2m}-N\diagdown{\overset{R_6}{\underset{R_7}{}}}$$

and $$NaAlH_2\left(OC_mH_{2m}-N\diagdown{\overset{R_6}{\underset{R_7}{}}}\right)_2$$

where $R_6$ and $R_7$ are preferably methyl. The equation for the reaction is:

(X) $2R_3COOCH_2CH_2N(CH_3)_2 + NaAlH_2$
$[OCH_2CH_2N(CH_3)_2]_2 \rightarrow 2R_3CHO + NaAl$
$[OCH_2CH_2N(CH_3)_2]_4$ All of the products obtained after hydrolysis with acid are fixed as salts and only the aldehyde remains as a product in the organic layer. Nevertheless even in this case, the describing above is necessary because a small amount of alcohol $R_4OH$ always can be formed as a product of total reduction according to the equation:

(XI) $2R_3COOR_4 + 2NaAlH_2(OCH_2CH_2OCH_3)_2 \rightarrow$
$NaAl(OCH_2R_3)_2(OCH_2CH_2OCH_3)_2$
$+ NaAl(OR_4)_2(OCH_2CH_2OCH_3)_2$ The total reduction XI takes place at a higher temperature and with a much higher reaction rate than that of aldehyde formation. For each type of ester there exists a temperature above which the total reduction XI occurs. This temperature depends strictly on the structure of $R_4$ in the starting ester $R_3COOR_4$ used. Thus the aldehyde formation should be carried out below the temperature at which substantial amounts of alcohol are formed. Generally the temperature should be below that at which 15% of alcohols are formed as part of the reduction product. The temperatures for significant total reduction to alcohol are as follows:

| | |
|---|---|
| $R_4COOR_3$ | $-55°$ to $-50°$ C. |
| $R_4COOCH_2CH_2N(CH_3)_2$ | $-55°$ to $-50°$ C. |
| $R_4COOCH_2CH_2OCH_3$ | $-55°$ to $-50°$ C. |
| $R_4COOC_2H_5$ | $-35°$ to $-30°$ C. |
| $R_4COO$ iso $C_3H_7$ | $-5°$ to $0°$ C. |
| $R_4COO$ t-$C_4H_9$ | Around $20°$ C. |

These temperatures are critical for the aldehyde synthesis to be successful and the reaction temperature has to be kept below the temperatures set forth above in order to prevent undesirable total reduction reaction XI.

Temperatures below $-95°$ C. are generally not practical since the solubility of the esters becomes fairly small at $-90°$ C. or below.

Reactivity of the esters decreases with their increasing "critical" temperature. For this reason esters requiring lower reaction temperatures are preferred. Reactivity of the esters of t-butyl alcohols are very low and the yields of aldehydes extremely small. The esters of phenols are non-reactive to produce aldehydes.

The constitution of the group $R_3$ in the ester $R_3COOR_4$ used has influence for the most part only on the reaction time. Nevertheless, derivatives with larger and heavier $R_3$ groups require slightly higher temperatures. The reaction time and temperature required in any given case can be indicated by testing the active hydrogen content in the reaction mixture. This is accomplished by exposing 3-5 drops of the reaction mixture to moist air. Hydrogen bubbles are evolved when the sample is exposed to the moist air or water. The reaction is finished when hydrogen is no longer evolved. The best procedure is to start the reaction at a temperature of $-70°$ to $-60°$ C. When the active hydrogen test does not show significant change within 2 hours a reaction mixture should be elevated to $-60°$ to $-50°$ C. For less reactive compounds the period of 6-7 hours can be used. Employing longer reaction times is usually without significant influence on the yields when the test for active hydrogen is still positive after 6-7 hours and the reaction can be then stopped by hydrolysis.

Unless otherwise indicated, all parts and percentages are by weight.

EXAMPLE 1

Into a 500 cc. three-necked round bottom flask equipped with a mechanical stirrer, drying tube, thermometer, and dropping funnel, 0.20 mole of starting ester $R_3COOR_4$ (25% excess) and 200 cc. of absolute solvent (see Table 1) were charged. The solution was cooled with stirring to the indicated reaction temperature and then 0.08 mole of $NaAlH_2(OCH_2CH_2OCH_3)_2$ as a 70% solution in benzene was added dropwise in about 45 minutes. The molar ratio ester: hydride was 2.5. Then the reaction mixture was kept at the reaction temperature with stirring and the active hydrogen present was checked every 30 minutes. The reaction was stopped when the active hydrogen test became negative or after 6-7 hours by adding 35 cc. of $H_2SO_4$ diluted with 125 cc. of water. Cooling was stopped and the first part of the acid was added dropwise until the evolution of hydrogen, if any, was finished and then the rest of the acid was added in one portion. Two clear layers were obtained. The organic layer was separated and the water layer was extracted with additional solvent until the last extract was aldehyde free in the aldehyde test. The organic layers were collected, neutralized with $Na_2CO_3$ and dried by stirring with anhydrous LiCl or $CaCl_2$ at room temperature overnight. The inorganic solids were filtered off, washed with solvent and then the combined organic solvent layers distilled using a rectification column. The yields are set forth in Table 1.

Active hydrogen test: 3-5 drops of the reaction mixture were taken with a capillary pipette on a glass plate and one drop of water was added on the edge of the liquid sample. When less than 5 small bubbles of hydrogen were evolved, the test was considered negative.

Aldehyde test: 3-5 drops of the extract were mixed with about 2 cc. of 2,4-dinitrophenyl hydrazine solution (2 grams of 2,4-dinitrophenyl hydrazine in 50 cc. of 85% $H_3PO_3$ diluted with 50 cc. of ethanol and filtered). The test was considered negative when the sample did not become cloudy.

The aldehyde formation is shown in Table 1.

TABLE 1

| Starting ester | Solvent | Temperature (°C.) | Time (hrs.) | Product (B.P. ° C.) | Yield |
|---|---|---|---|---|---|
| $(CH_3)_2CHCOOCH_3$ | Toluene | $-70$ to $-60$ | 4 | $(CH_3)_2CHCHO$, 61-63.5° | 8.9 g., 77.0%. |
| $CH_3CH_2COOCH_2CH_2OCH_3$ | do | do | 4.5 | $CH_3CH_2CHO$, 47-49° | 7.8 g., 84.0%. |
| $CH_3(CH_2)_3COOCH_3$ | Ether | do | 6 | $CH_3(CH_2)_3CHO$, 102-104° | 12.1 g., 88.0%. |
| $CH_3(CH_2)_6COOCH_3$ | do | $-65$ to $-55$ | 4 | $CH_3(CH_2)_6CHO$, 71-72.5° (20 min.) | 16.5 g., 80.5%. |
| $CH_3(CH_2)_{16}COOCH_2CH_2OCH_3$ | Tetrahydrofuran[1] | $-60$ to $-50$ | 6 | $CH_3(CH_2)_{16}CHO$ | 10.7 g., 52.5%. |
| $(CH_3)_3CCOOCH_2CH_2OCH_3$ | Toluene | do | 6 | $(CH_3)_3CCHO$ 74-76° | 10.3 g., 75.0%. |
| $C_6H_5COOCH_3$ | Ether | do | 6 | $C_6H_5CHO$ 112-5° (100 min.) | 9.85 g., 58%. |
| $C_6H_{11}COOC_2H_5$ | do | do | 5 | $C_6H_{11}CHO$, 75-78° (20 min.) | 12.9 g., 72.3%. |
| $C_2H_5OOC(CH_2)_4COOC_2H_5$ | do | do | 6 | $OHC(CH_2)_4CHO$, 91-94° (9 min.) | 12.8 g., 70.5%. |

[1] Ether was used for the extraction.

EXAMPLE 2

Into the same apparatus as described in Example 1 except using a 1 liter flask there were added 0.125 mole of starting ester $R_3COOCH_2CH_2N(CH_3)_2$ (25% excess) and 200 cc. of absolute ether. The solution was cooled to —70° C. and then 0.05 mole of $$NaAlH_2[OCH_2CH_2N(CH_3)_2]_2$$

as a 70% benzene solution was added in about 45 minutes. The reaction mixture was kept under stirring in the temperature range —70° C. to —50° C. and tested for the period of time necessary as described in Example 1. The reaction was then stopped by adding 40 cc. of $H_2SO_4$ in 160 cc. of water at a temperature of —5° to 0° C. and the aldehyde produced was isolated in the same way described in Example 1. The yields of aldehyde are set forth in Table 2.

EXAMPLE 3

Into the same apparatus as described in Example 1 was charged 0.15 mole of $CH_3COOR_4$ and 100 cc. of absolute ether. The solution was cooled to the indicated reaction temperature and $0.1/X$ moles of $$NaAlH_x(OR_8)_{4-x}$$

as a 70% benzene solution was added dropwise in 45 minutes. The reaction mixture was kept for the period of time necessary according to the active hydrogen test. Then the cooling was stopped, 120 cc. of water containing 2.5 to 3 cc. of $H_2SO_4$ was added, the thermometer replaced with a 20 cm. long Vigreux distillation column connected with a cooling trap (—70° C.) of 500 cc. volume and distilled as long as the test on the presence of aldehyde was positive (about 300 cc. of distillate). Distillate from the trap was transferred into a 500 cc. volumetric flask, filled up with methyl alcohol and the content of acetaldehyde was determined in 10 cc. of this solution by mixing 25 cc. of 0.2 N Tollens reagent (silver oxide solution in dilute ammonium hydroxide) and 5 cc. of 10% aqueous sodium hydroxide, left overnight, the silver reduced filtered, washed and the residue of silver in the clear filtrate determined after acidification with 11 cc. of concentrated $HNO_3$ by titration with a 0.1 N solution of $NH_4SCN$ using $(NH_4)_2Fe(SO_4)_2$ as the indicator. The yield of acetaldehyde in percent in this procedure is $$5 \times \left(25 - \frac{A}{2}\right)$$

where A is the cc. of 0.1 N $NH_4SCN$ solution consumed. The yields are given in Table 3.

TABLE 3

| Starting ester | | Temp. (° C.) | Time (hrs.) | Yield (percent) $CH_3CHO$ |
|---|---|---|---|---|
| $CH_3COOCH_3$ | $NaAlH_2(OCH_2CH_2OCH_3)_2$ | —70 | 5 ([1] 4.5) | 92.5 ([1] 76.3) |
| $CH_3COOCH_3$ | $NaAlH_2(OCH_2CH_2OCH_3)_2$ | —50 | 3 ([1] 1.25) | 65.8 ([1] 45.8) |
| $CH_3COOCH_3$ | $NaAlH_2(OCH_2CH_2OCH_3)_2$ | —30 | 2.5 | 28.8 |
| $CH_3COOCH_3$ | $NaAlH_2(OCH_2CH_2OCH_3)_2$ | —10 | 1.5 | 13.0 |
| $CH_3COOC_2H_5$ | $NaAlN_2(OCH_2CH_2OCH_3)_2$ | —70 | 4 | 92.0 |
| $CH_3COOC_3H_5$ | $NaAlH_2(OCH_2CH_2OCH_3)_2$ | —45 | 2.75 | 43.0 |
| $CH_3COOi-C_3H_7$ | $NaAlH_2(OCH_2CH_2OCH_3)_2$ | —70 | 4.5 | 76.3 |
| $CH_3COOi-C_3H_7$ | $NaAlH_2(OCH_2CH_2OCH_3)_2$ | —30 | 1.5 | 12.25 |
| $CH_3COOt-C_4H_9$ | $NaAlH_2(OCH_2CH_2OCH_3)_2$ | —40 | 5.75 | 29.75 |
| $CH_3COOt-C_4H_9$ | $NaAlH_2(OCH_2CH_2OCH_3)_2$ | 0 | 3.5 | 9.5 |
| $CH_3COOCH_2CH_2OCH_3$ | $NaAlH_2(OCH_2CH_2OCH_3)_2$ | —70 | 4.5 | 89.5 |
| $CH_3COOCH_2CH_2N(CH_3)_2$ | $NaAlH_2(OCH_2CH_2OCH_3)_2$ | —60 | 5 | 90.2 |
| $CH_3COOC_6H_5$ | $NaAlH_2(OCH_2CH_2OCH_3)_2$ | 0 | 6 | 0 |
| $CH_3COOCH_3$ | $NaAlH_2[OCH_2CH_2N(CH_3)_2]_2$ | —60 | 5 | 91.2 |
| $CH_3COOCH_3$ | $NaAlH_2(OCH_2CH_2OC_2H_5)_2$ | —60 | 5 | 90.8 |
| $CH_3COOCH_3$ | $NaAlH_2[OCH_2CH_2N(C_2H_5)_2]_2$ | —60 | 4.5 | 89.3 |
| $CH_3COOCH_3$ | 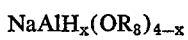 | —60 | 5 | 88.7 |
| $CH_3COOCH_3$ | $NaAlH(OCH_2CH_2OCH_3)_3$ | —60 | 4 | 92 |
| $CH_3COOCH_3$ | $NaAlH[OCH_2CH_2N(CH_3)_2]_3$ | —60 | 5 | 90.5 |

[1] Yields obtained by normal procedure (ester was drop-wise added to the cooled diluted hydride solution).

EXAMPLE 4

22.7 grams of 3-pyridine carboxylic acid ethyl ester (0.15 mole) was treated with 15 cc. of sodium dihydro bis(methoxyethyl) aluminate and 200 cc. of diethyl ether at —70° C. for 8 hours. Then 120 cc. of 25% aqueous sodium hydroxide were added. Two clear layers were obtained. The aqueous layer was extracted with ether and the ether extract added to the organic layer. The organic material was then dried over sodium sulfate, concentrated and collected. There was obtained nicotinaldehyde in a yield of 83.5% (by gas chromatography).

EXAMPLE 5

16.8 grams of the methyl ester of 2-furanecarboxylic acid were dissolved in 200 cc. of diethyl ether and cooled to —70° C. while stirring. 25 cc. of a 70% solution of sodium dihydro bis(methoxyethyl) aluminate in ether was added during 20 minutes. The mixture was stirred for 6 hours at —70° C. Then 100 cc. of 20% aqueous sulfuric acid were added and the temperature rose to 10° C. Two clear layers were formed. The organic layer was separated and the water layer extracted with diethyl ether. The combined organic layers contained the furfuraldehyde. It was isolated as the oxime by adding to the organic layers a solution prepared from 7 grams of hydroxylamine hydrochloride in 100 cc. of methanol and 4.5 grams of sodium hydroxide in methanol. The mixture was allowed to stand for 12 hours. The precipitate of sodium chloride was removed. The residue was stripped of solvent, dried azeotropically with toluene and the product crystallized at low temperature. 8.7 grams of furfuraldoxime (78.5% yield) were obtained.

TABLE 2

| Starting ester | Temperature (°C.) | Time (hrs.) | Product (B.P. °C.) | Yield |
|---|---|---|---|---|
| $CH_3(CH_2)_3COOCH_2CH_2N(CH_3)_2$ | —70 to —50 | 4.5 | $CH_3(CH_2)_3CHO$, 101–104° | 7.05 g., 82%. |
| $CH_3(CH_2)_4COOCH_2CH_2N(CH_3)_2$ | —60 to —50 | 6 | $CH_3(CH_2)_4CHO$, 126–128° | 8.20 g., 81.5%. |
| $CH_3(CH_2)_6COOCH_2CH_2N(CH_3)_2$ | —60 to —50 | 6 | $CH_3(CH_2)_6CHO$, 70–72° (20 min.) | 9.80 g., 76.5%. |

EXAMPLE 6

Into the apparatus described in Example 1, 0.133 mole of starting ester $RCOOCH_3$ and 200 cc. of absolute solvent were charged (see Table 4). The solution was cooled to $-70°$ C. and 0.05 mole of $NaAlH_2(OCH_2CH_2OCH_3)_2$ as a 70% benzene solution was added in 20 minutes. The reaction mixture was kept at $-75°$ C. under stirring for a period of time according to Table 4. Then cooling was stopped. 25 cc. of $H_2SO_4$ diluted with 100 cc. of water was added. The organic layer was separated, the water layer was extracted with the appropriate amount of the solvent, and the organic layers were combined. The solution obtained was neutralized by shaking with a small amount of saturated water solution of $Na_2CO_3$, washed with water to neutral reaction and then a solution of 16 g. of $NaHSO_3$ in 60 cc. of water were added. The mixture was shaken over night, the crystalline material was filtered off, washed with ether, dried and weighed. The yields are shown in Table 4.

of 1 to 17 carbon atoms, phenyl, tolyl or nicotinyl, $R_4$ is lower alkyl, benzyl or $R_5(OC_mH_{2m})_l$—, where $R_5$ is alkyl of 1 to 4 carbon atoms; 1 is an integer of 1 to 2, and $R_8$ is tetrahydrofurfuryl,

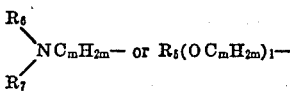

3. A process according to claim 1 wherein R is alkyl of 1 to 17 carbon atoms, furfuryl, or nicotinyl and the aldehyde formed has the formula RCHO.

4. A process according to claim 1 wherein any alkyl group in $R_4$, $R_5$, $R_6$ and $R_7$ is a normal alkyl group and the reaction temperature is not higher than about $-40°$ C. or below $-90°$ C.

5. A process according to claim 4 wherein $x$ is 1.

6. A process according to claim 4 where $x$ is 2.

7. A process according to claim 6 wherein $R_4$ is $$R_5(OC_mH_{2m})$$

TABLE 4

| Starting ester | Solvent | Time (hrs.) | Product | Yield |
|---|---|---|---|---|
| $CH_3(CH_2)_4COOCH_3$ | Ether | 8 | $CH_3(CH_2)_4CH(OH)(SO_3Na)$ | 18.6 g., 91.1%. |
| $CH_3(CH_2)_5COOCH_3$ | Toluene | 8 | $CH_3(CH_2)_5CH(OH)(SO_3Na)$ | 16.7 g., 76.5%. |
| $CH_3(CH_2)_6COOCH_3$ | Ether | 8 | $CH_3(CH_2)_6CH(OH)(SO_3Na)$ | 19.25 g., 83.2%. |
| 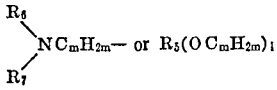—COOCH₃ | do | 6 | Ph—CH(OH)(SO₃Na) | 18.0 g., 83.3%. |

What is claimed is:

1. A process for forming aldehydes of the formula RCHO or the formula $OCH(CH_2)_nCHO$ which consists essentially of reducing an ester of the formula $R_3COOR_4$ or $R_4OOC(CH_2)_nCOOR_4$ with a sodium aluminum hydride reducing agent of the formula $NaAlH_x(OR_8)_{4-x}$ in an ether or aromatic hydrocarbon solvent at a temperature of not over $0°$ C. and below the temperature at which there is substantial reduction of the ester of alcohol where $n$ is 0 or a positive integer up to 10, R is alkyl of 1 to 19 carbon atoms, phenyl, tolyl, naphthyl, lower alkoxy lower alkyl, pyridyl, phenylmethyl, 3-ethyl-4-pyridyl, chlorophenyl, methyl, chlorophenyl, methyl fluorophenyl, fluorophenyl, bromophenyl, lower alkoxyphenyl, lower alkoxynaphthyl, and indenyl, $R_3$ is the same as R, $R_4$ is lower alkyl, benzyl, $R_5(OC_mH_{2m})_l$—, where $R_5$ is lower alkyl, or benzyl, $m$ is an integer of 2 to 4, $l$ is an integer of 1 to 4, $R_8$ is tetrahydrofurfuryl, lower alkyl tetrahydrofurfuryl, pyranylmethyl,

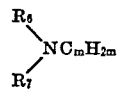

and $x$ is 1 or 2 wherein $R_6$ and $R_7$ are loweralkyl or loweralkoxyloweralkyl.

2. A process according to claim 1 wherein R is alkyl

8. A process according to claim 7 wherein both $R_4$ and $R_8$ are $R_5(OC_mH_{2m})_l$, $l$ is 1, $R_5$ is alkyl of 1 to 2 carbon atoms and $n$ is 2.

9. A process according to claim 7 wherein $R_8$ are

$R_6$ and $R_7$ are alkyl of 1 to 2 carbon atoms and $m$ is 2.

10. A process according to claim 1 wherein the temperature of reactions is between $-40°$ C. and $-70°$ C.

11. A process according to claim 1 wherein the hydride $NaAlH_x(OR_8)_{4-x}$ is added into a solution of the ester.

References Cited
UNITED STATES PATENTS 3,147,272    9/1964    Brown et al. _____ 260—598 X ALAN L. ROTMAN, Primary Examiner U.S. Cl. X.R.

260—289 R, 293.8, 326.5 J, 345.1, 347.8, 347.9, 465 F, 465.6, 576, 332.3, 598, 599